May 24, 1960
L. S. WILLIAMS
2,937,862
WEIGHING SCALE
Filed March 4, 1957
11 Sheets-Sheet 1
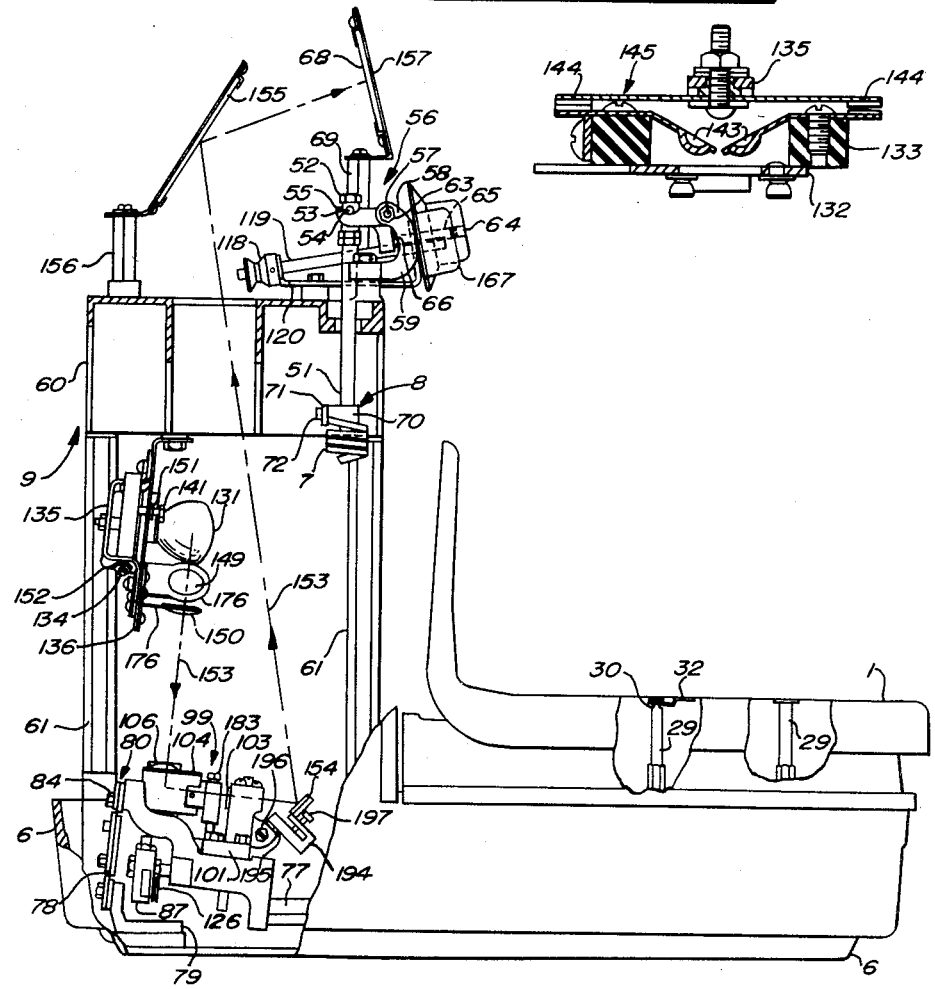
INVENTOR.
LAWRENCE S. WILLIAMS
BY
Marshall, Marshall & Yeasting
ATTORNEYS May 24, 1960
L. S. WILLIAMS
2,937,862
WEIGHING SCALE
Filed March 4, 1957
11 Sheets-Sheet 2
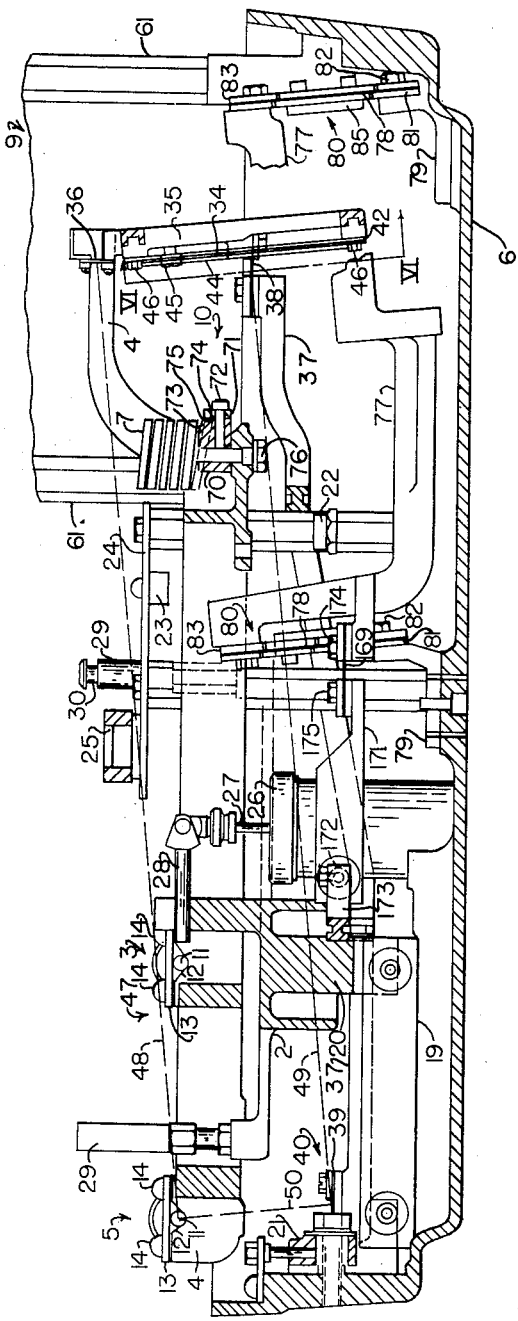
Fig. II
INVENTOR.
LAWRENCE S. WILLIAMS
BY
Marshall, Marshall & Geasting
ATTORNEYS

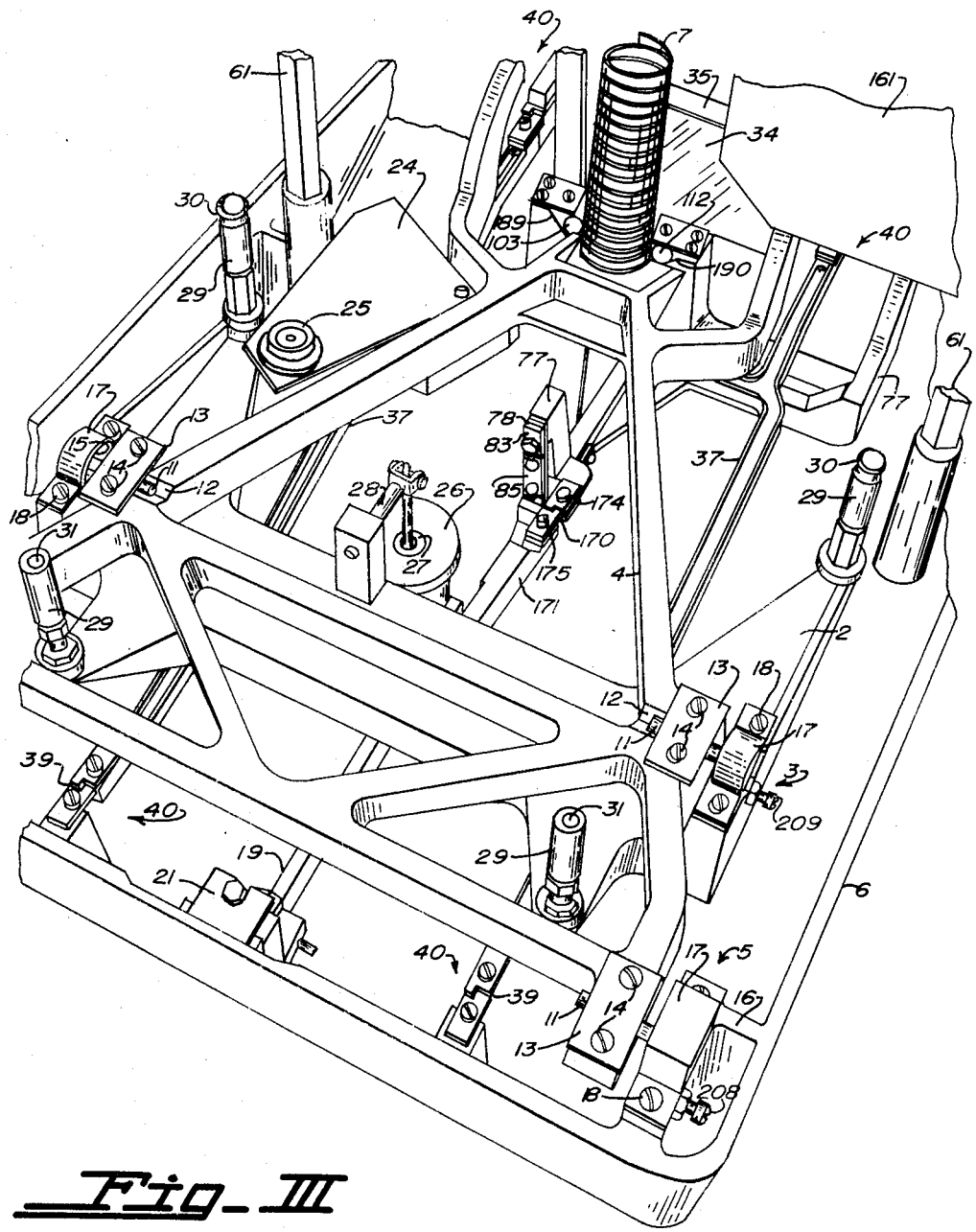
Fig. III
INVENTOR.
LAWRENCE S. WILLIAMS

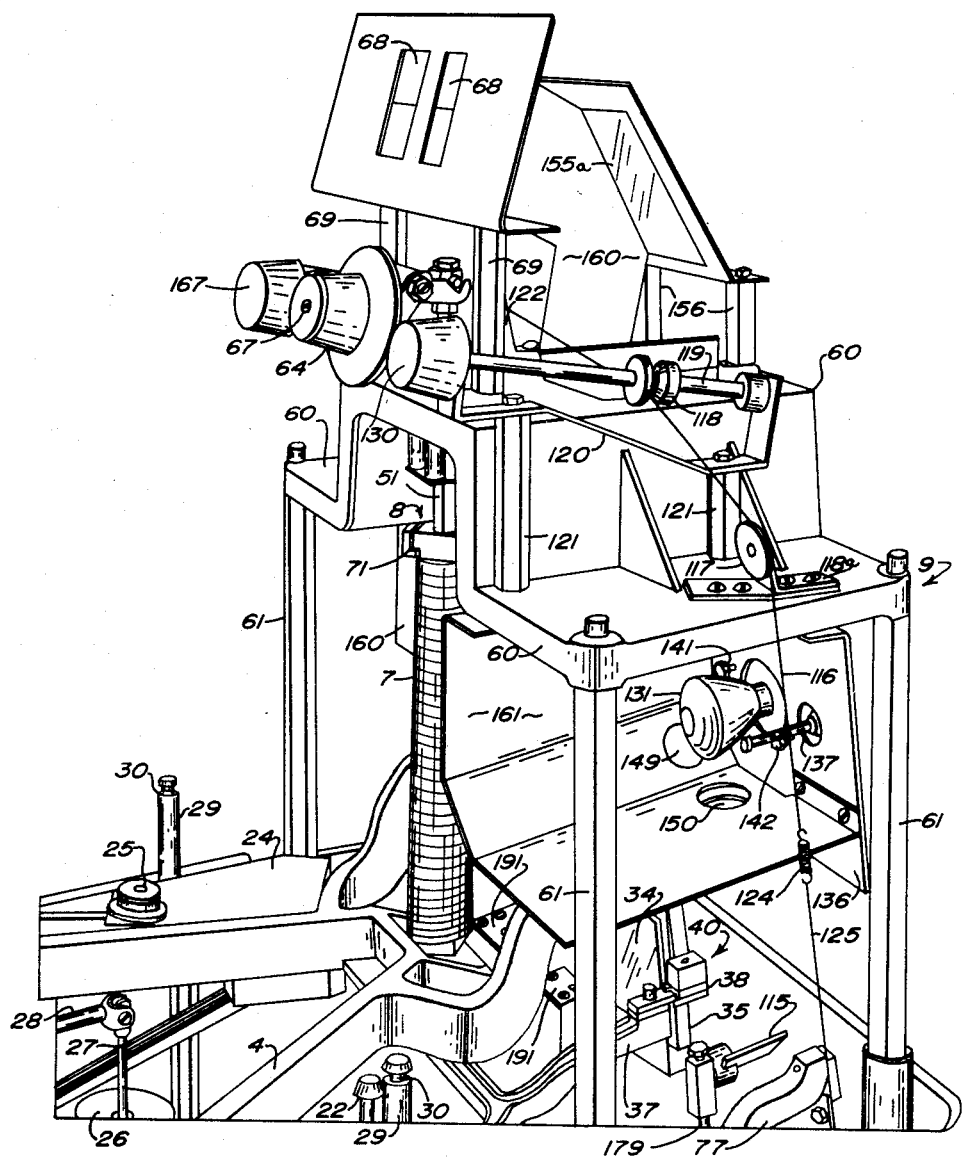
Fig. IV

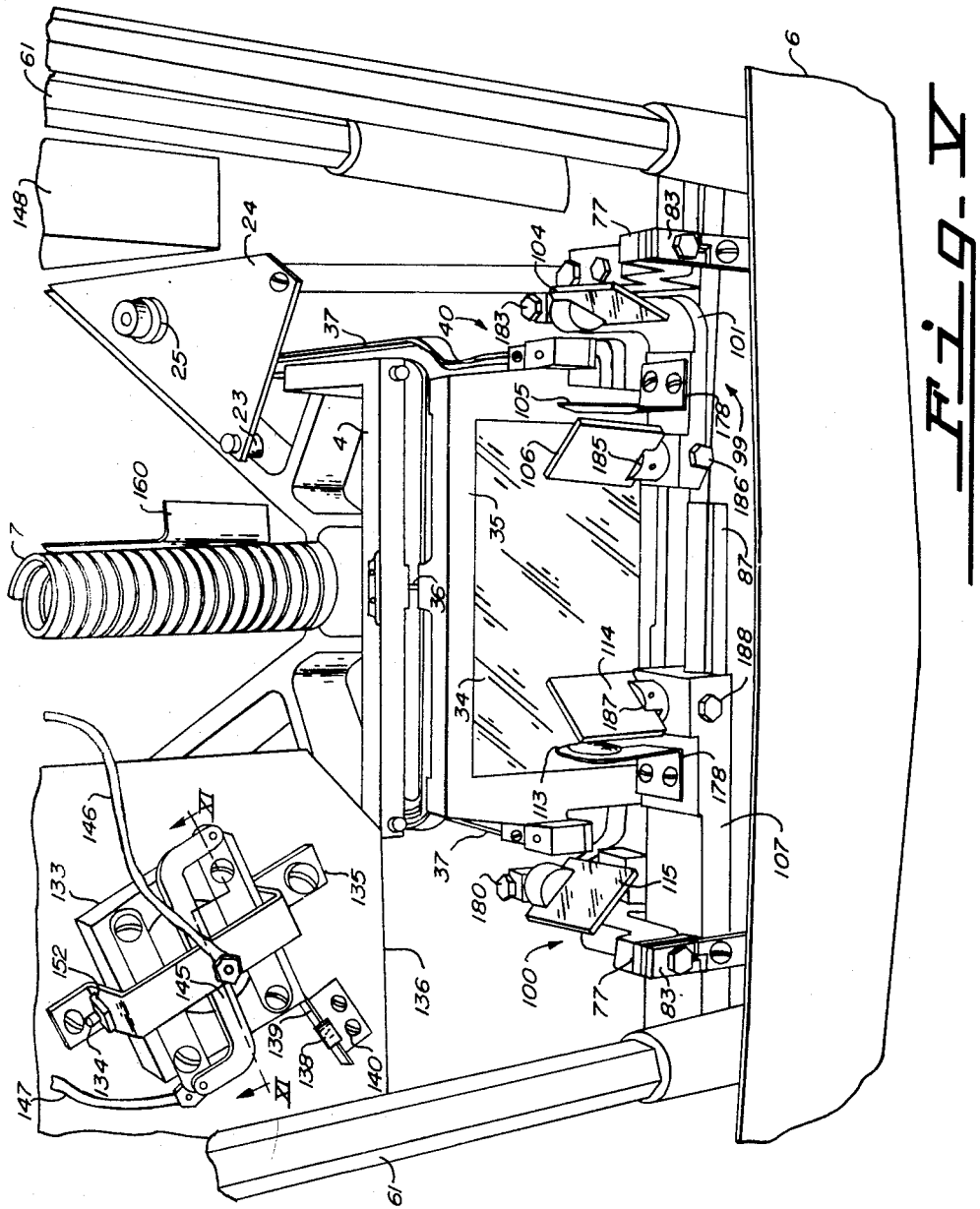

May 24, 1960
L. S. WILLIAMS
2,937,862
WEIGHING SCALE
Filed March 4, 1957
11 Sheets-Sheet 6
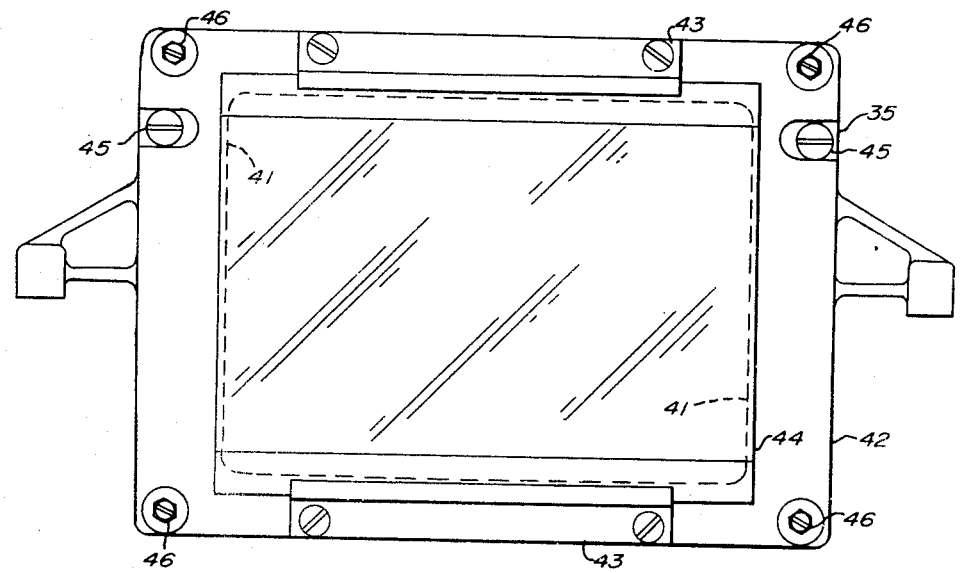
Fig. VI
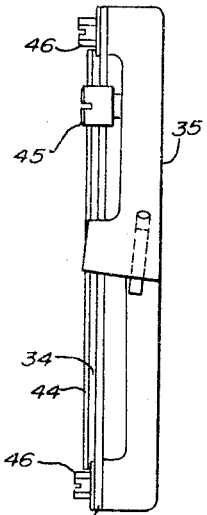
Fig. VII
INVENTOR.
LAWRENCE S. WILLIAMS
BY
Marshall, Marshall & Geasting
ATTORNEYS

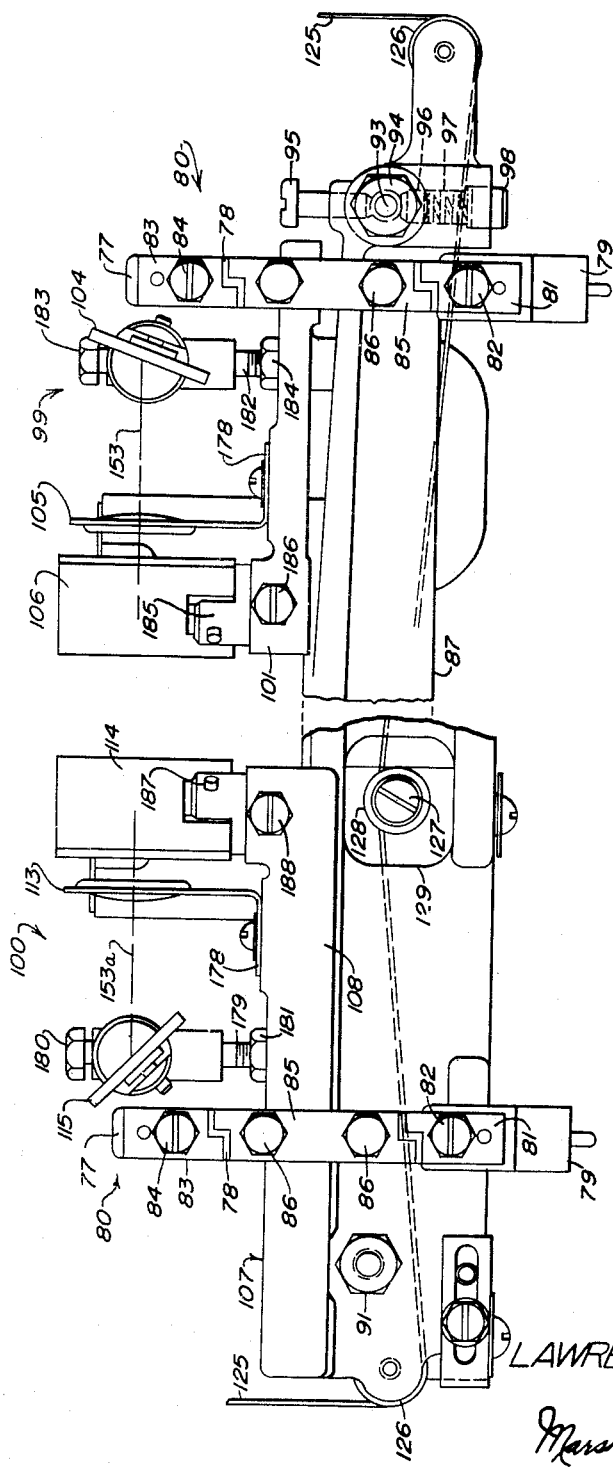

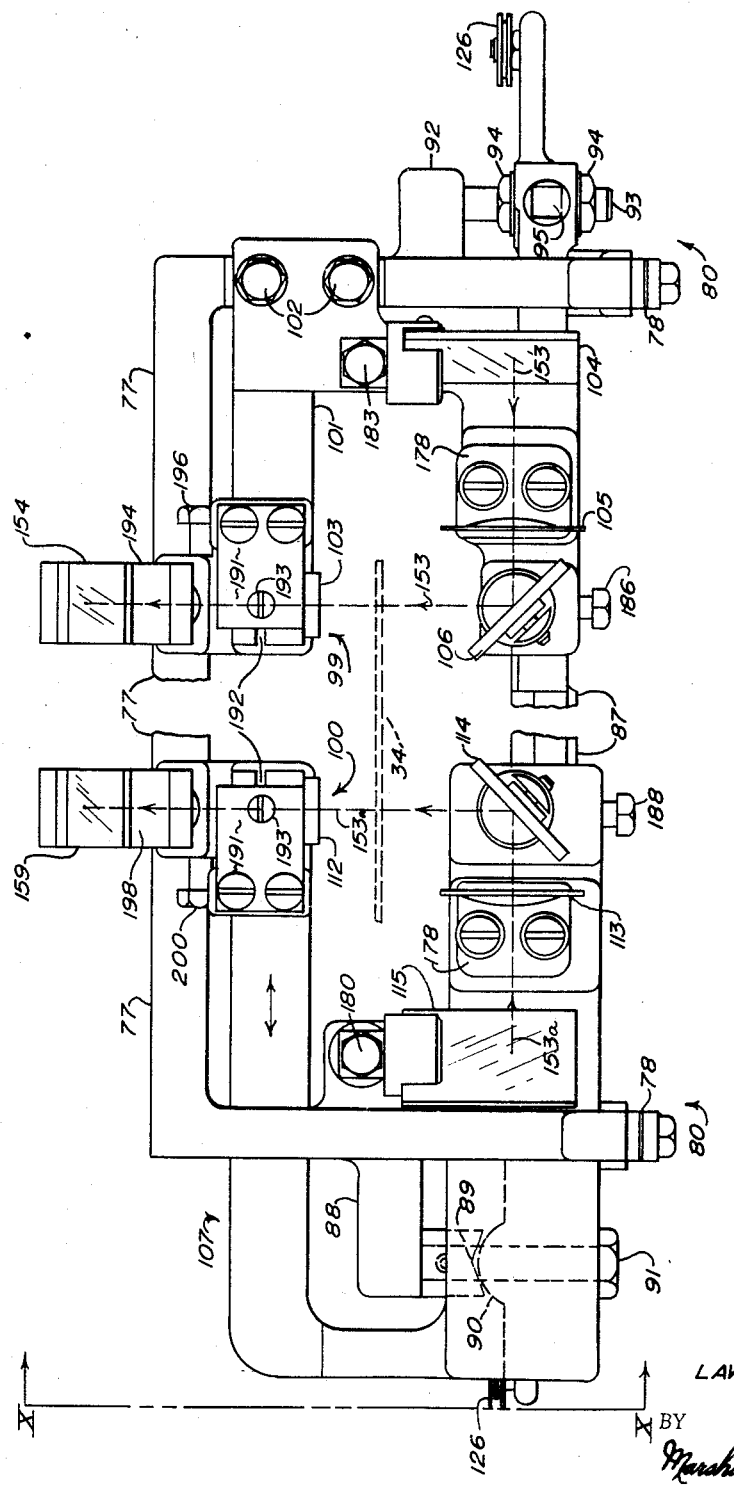

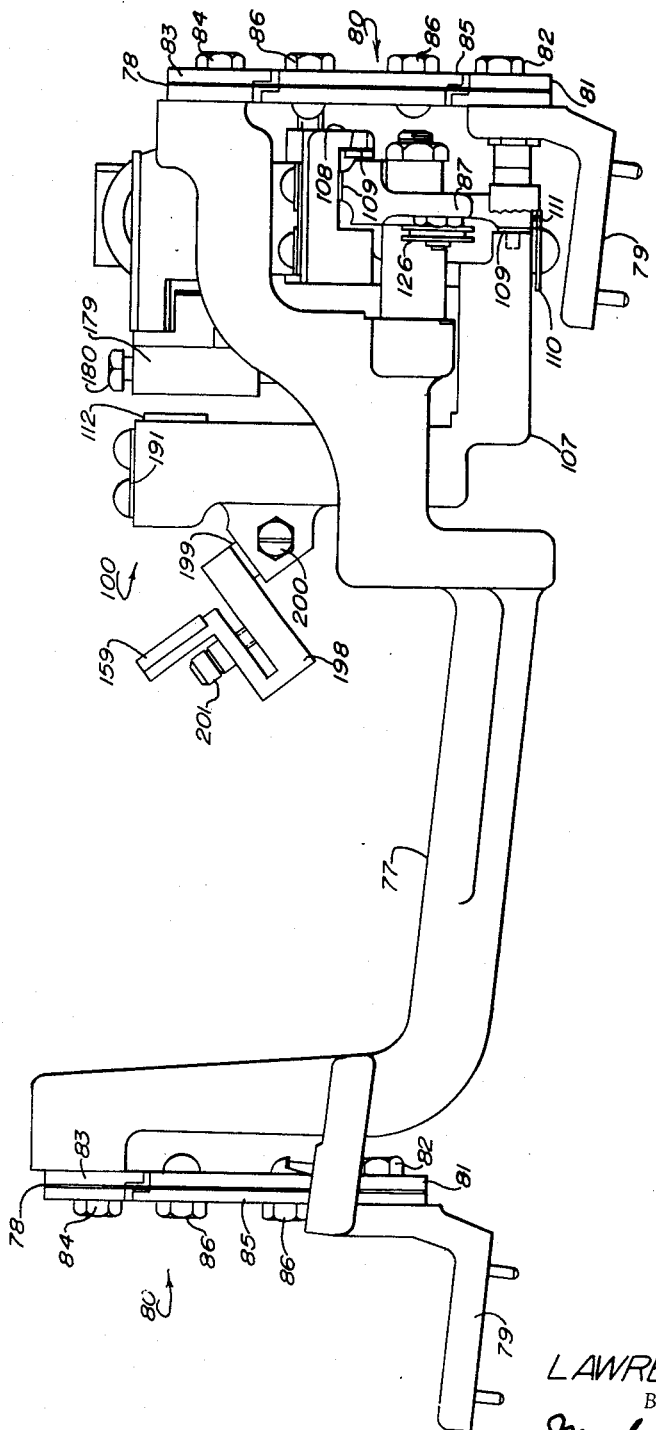

May 24, 1960 L. S. WILLIAMS 2,937,862
WEIGHING SCALE
Filed March 4, 1957 11 Sheets-Sheet 10
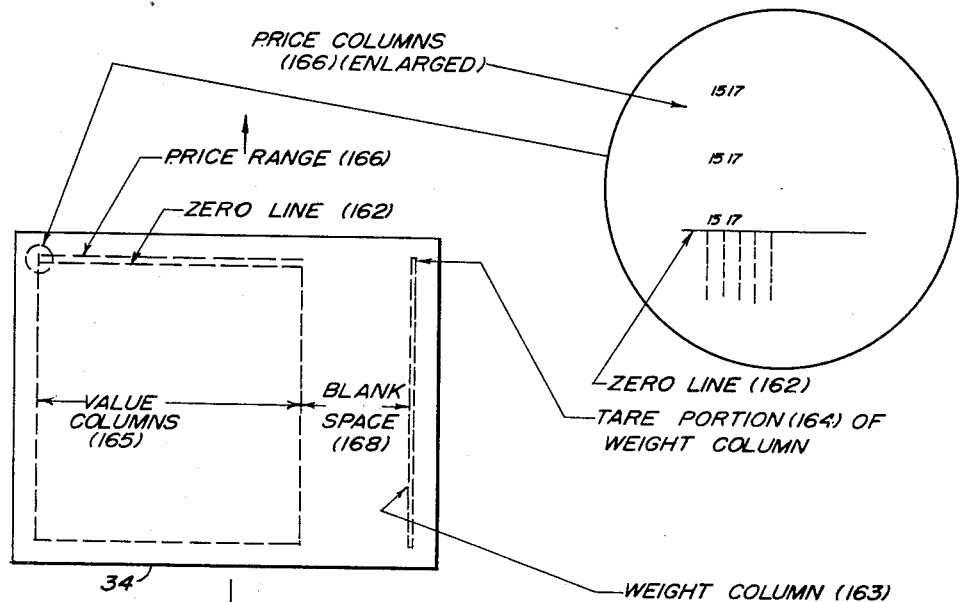
*Fig. XII*
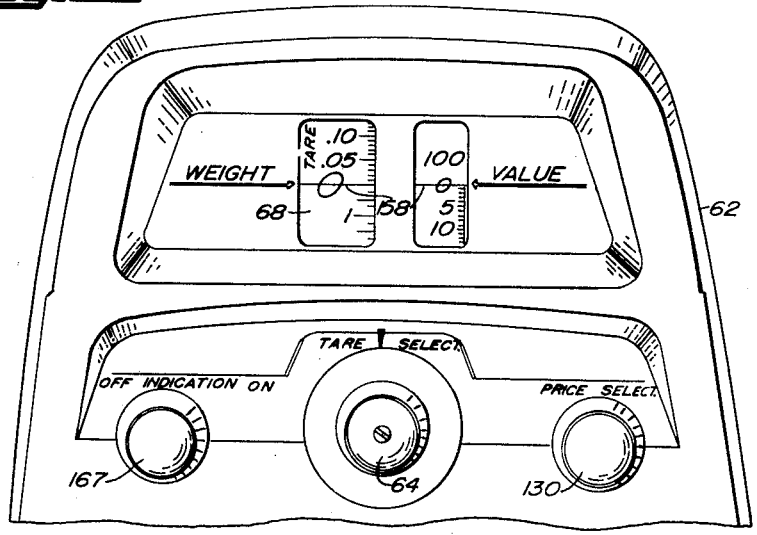
*Fig. XIII*
INVENTOR.
LAWRENCE S. WILLIAMS
BY
Marshall, Marshall & Yeasting
ATTORNEYS May 24, 1960
L. S. WILLIAMS
2,937,862
WEIGHING SCALE
Filed March 4, 1957
11 Sheets-Sheet 11
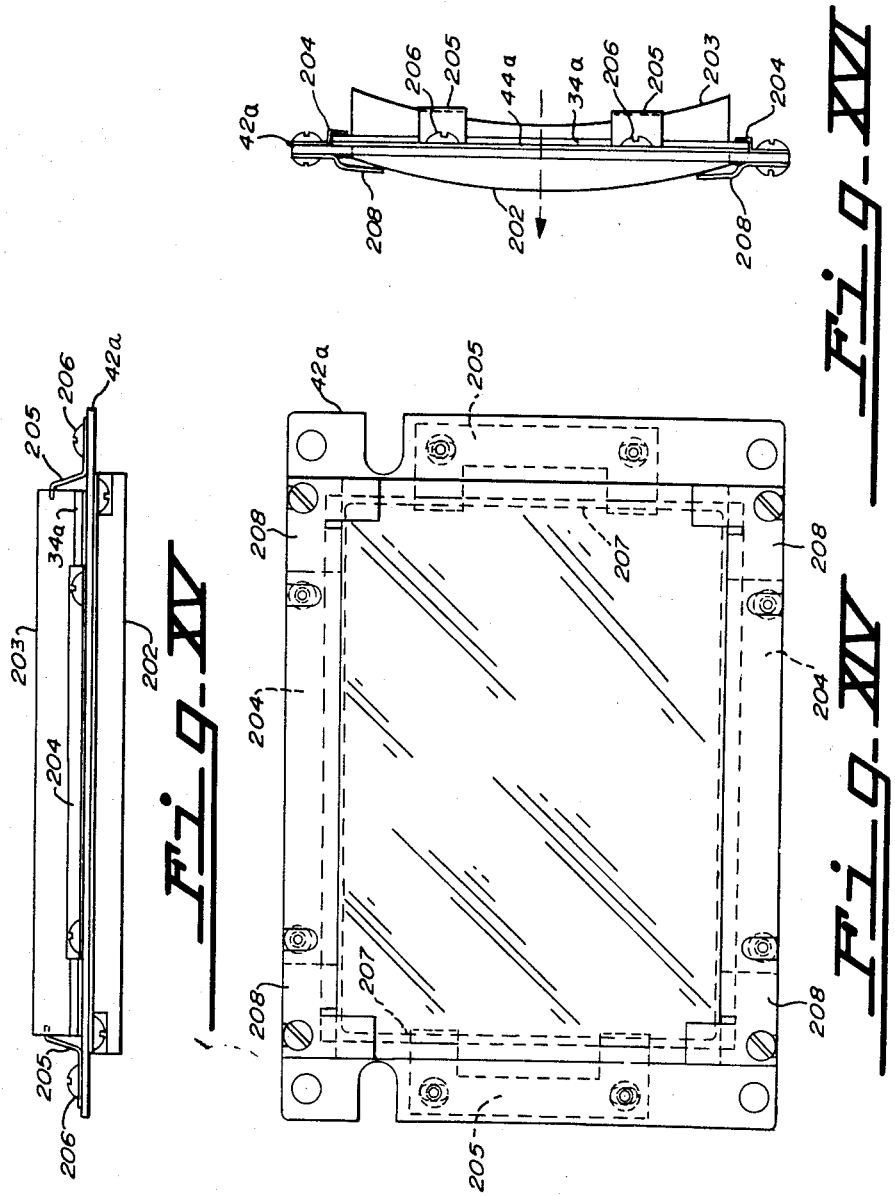
INVENTOR.
LAWRENCE S. WILLIAMS
BY
Marshall, Marshall & Yeasting
ATTORNEYS

United States Patent Office 2,937,862
Patented May 24, 1960

2,937,862
WEIGHING SCALE

Lawrence S. Williams, Toledo, Ohio, assignor, by mesne assignments, to Toledo Scale Corporation, Toledo, Ohio, a corporation of Ohio Filed Mar. 4, 1957, Ser. No. 643,693

16 Claims. (Cl. 265—29)

This invention relates to weighing scales and more particularly to projected indication weighing scales.

In such scales, greatly enlarged images of indicia on a chart movable in response to a pivotally mounted lever are projected by means of an optical system onto a display screen to be read by the scale operator and/or the customer. The end of a pivotally mounted lever moves in an arc and, therefore, in order to keep the focus of the optical system from being effected by the arcuate movement of the lever, many projected indication scales, heretofore, have included complicated linkages between the lever and the chart to drive the chart in a straight path. Since such images are greatly enlarged, small imperfections in such linkages, which may arise from dirt deposits and wear during use, are greatly magnified by the optical system and may appear as significant errors in the weighing results.

It is accordingly the principal object of this invention to eliminate chart drive linkages in projected indication weighing scales and yet have highly accurate and reliable scales.

Another object of the invention is to provide an improved optical system for a projected indication weighing scale.

A further object of the invention is to provide a compact projected indication weighing scale of rugged, low cost construction which is simple to operate and which provides brilliant, easy-to-read projected indications of weight, unit price and computed value.

Other objects and advantages will be apparent from the following description of preferred forms of the invention.

According to the invention, the improved projected indication weighing scale includes a pair of pivotally mounted levers which forms the opposite sides of a parallelogram. In order to eliminate the usual chart drive linkages, an indicia-bearing chart is mounted directly on the levers and forms another one of the sides of the parallelogram. The chart is carried by the levers in an arcuate path such that the chart has a component of motion normal to its face and, because of the parallelogram geometry, the plane of the chart in any position in the path is parallel to the plane of the chart in any one of its other positions. An improved optical system for projecting images of the indicia on the chart onto a display screen is provided and includes novel means for automatic focusing to compensate for the component of motion of the chart.

The means for automatic focusing may include a pivotally mounted optical frame which carries the projection lenses of the optical system and which is movable in response to movement of the levers to maintain the physical distance between the chart and the projection lenses approximately constant, thus keeping the system in focus, or it may include a positive lens in juxtaposition with the chart so that the lens and the chart move in the arcuate path as one, the positive lens functioning to maintain the optical distance between the chart and the projection lens constant, thus keeping the system in focus.

Several preferred embodiments of the invention are illustrated in the accompanying drawings.

In the drawings:

Figure I is a side elevational view of the projected indication weighing scale, parts being broken away and parts being shown in section for clarity of illustration.

Figure II is an elevational view as seen from a position at the far side of the weighing scale which is illustrated in Figure I, the upper part of the scale and certain adjuncts being broken away and other parts being shown generally in central section.

Figure III is a perspective view as seen from a position slightly to the left and above Figure II looking down into the base of the scale.

Figure IV is a perspective view of the upper part of the weighing scale with its housing removed to reveal inner details.

Figure V is a perspective view of the back of the scale as seen from a position to the right of Figure II looking toward the scale.

Figure VI is a front elevational view of the chart assembly as seen from the line VI—VI of Figure II looking in the direction indicated by the arrows.

Figure VII is an end elevational view of the chart assembly which is shown in Figure VI.

Figure VIII is an elevational view in enlarged detail showing the optical projection systems which are illustrated in Figure V.

Figure IX is a plan view of the apparatus which is illustrated in Figure VIII.

Figure X is an end elevational view as seen from a position along the line X—X of Figure IX looking in the direction indicated by the arrows.

Figure XI is a sectional view taken along the line XI—XI of Figure V.

Figure XII is a schematic diagram of the chart which is illustrated in Figure VI.

Figure XIII is a perspective view of the front of the upper part of the scale housing.

Figure XIV is a front elevational view which is similar to Figure VI and which shows a modified chart assembly.

Figure XV is a plan view of the chart assembly which is illustrated in Figure XIV.

Figure XVI is an end elevational view of the chart assembly which is illustrated in Figure XIV.

These specific figures and the accompanying description are intended merely to illustrate the invention and not to limit its scope.

Referring to Figures I–V, the force of gravity acting on a load placed upon a load receiver or platter 1 is transmitted through a spider 2 and load bearings 3 to a second class main lever 4 fulcrumed on bearings 5 in a base 6 of a projected indication weighing scale. These load forces acting on the lever 4 are transmitted to a helical load counterbalancing spring 7 which is connected at its upper end through a calibrator clamp 8 to a frame 9 of the scale and at its lower end through a second calibrator clamp 10 to the end of the lever. The weighing mechanism, i.e., the spring 7, is movable with the lever 4 and movable relative to the frame 9. Preferably, the spring 7 is a flat-sided spring that is generally rectangular in cross section. Instead of the single spring counterforce 7, several springs may be used in parallel or the spring counterforce may be divided into several sections by an intermediate strut.

The pivotal connections for connecting the lever 4 to the spider 2 and to the base 6 of the scale include the ball bearings 3 and 5 instead of the usual knife edges and V-bearings to eliminate friction and to aid in maintaining the optical projection system, hereinafter described, in focus. Each of the pivotal connections comprises a stud 11 that is positioned in a transverse groove 12 milled in the lever 4 and clamped by a cover plate 13 attached to the lever by means of a pair of screws 14. The studs 11 extend laterally either side of the side portions of the lever 4, there being two of the studs provided for the fulcrum axis and two provided for the load pivot axis. The studs are extended inwardly toward each other or outwardly as shown according to the available space and required lateral stability. The studs 11 engage the inner races of the ball bearings 3 and 5 mounted within cup-shaped housings 15 that are clamped in pedestals 16 (Figure III) of the base 6 or in the spider 2 (Figure III). The bearing housings 15 are clamped in position by straps 17 fitting over the housings and held in place by screws 18. The main lever 4, thus, is supported at its one end by the fulcrum bearings 5 and at its other end by the load counterbalancing spring 7 and the spider 2 is hung from the lever 4 by means of the load bearings 3.

The spider 2 is held in an upright position by an ordinary check link 19 one end of which is pivotally connected by means of ball bearings to a leg 20 (Figure II) of the spider 2 and the other end of which is pivotally mounted by means of ball bearings in an adjustable pedestal 21 (Figures II and III) in the base 6 of the scale. In order that the scale shall weigh accurately for all positions of a load thereupon, it is necessary that the effective length of the check link 19 shall be exactly equal to the distance between the fulcrum axis and the load pivot axis of the lever 4 and that the check link be exactly parallel to the pivot line of the lever for all positions occupied by the lever during normal weighing operations. Such positions occupied by the lever are limited by a lower rubber stop 22 attached to the base 6 of the scale and by an upper rubber stop 23 attached to a stationary platform 24 erected from the base which limit stops may engage the lever at the extreme ends of its range of travel. The platform also functions to support a level 25 which is used to check the orientation of the scale.

A dash pot 26 is mounted on the base 6 of the scale and has its plunger 27 pivotally connected to an arm 28 extending from the spider 2. The dash pot 26 serves to prevent continued oscillation of the lever system following a change in load.

The load receiver or platter 1 is removably mounted on four posts 29 erected from the spider 2. The upper parts of two of the posts 29 have circular grooves 30 (Figures I, III and IV) therearound and the other posts 29 have cylindrical depressions 31 (Figure III) in their upper ends. A pair of clips 32 on the bottom of the platter 1 (Figure I) engage the circular grooves 30 and a pair of tenons (not shown) also on the bottom of the platter 1 fit into the cylindrical depressions 31. In order to remove the platter from the scale, the front end of the platter is elevated to lift the tenons from the depressions and the platter is moved forward to clear the clips 32 from the posts.

A chart 34, which carries appropriate indicia with respect to weight, unit price and computed value of the material to be weighed on the scale, is mounted on a generally rectangular frame 35 which is pivotally attached to the spring supported end of the lever 4 by an upper chart frame flexure ribbon 36 (Figures II and V) and which is pivotally attached to the end of a chart lever 37 by a pair of lower chart frame flexure ribbons 38 (Figure II), the chart lever 37 being pivotally attached in turn at its other end to the base of the scale by a pair of chart lever flexure ribbons 39 (Figures II and III). Greatly enlarged images of the indicia on the chart, which is movable with the levers 4 and 37, are projected by means of an improved optical system onto a display screen hereinafter described to be read by the scale operator and/or the customer.

The flexure ribbons may be protected by limit stop guards 40 to prevent them from buckling under unusual forces. Each of the guards 40 includes a pair of clamp members on one side of the flexure ribbon and another pair of clamp members on the other side of the flexure ribbon, the clamp members in each pair of members being spaced slightly from each other and being slightly relieved adjacent the bending area of the flexure ribbon to permit the flexure ribbon to bend without touching the guard within limits. Screws which hold the clamp members together and which also attach the clamp members to the several points in the scale also serve to hold the flexure ribbons between the clamp members in sandwiched form. The guards 40 for the pair of chart lever flexure ribbons 39 are shown in Figure III, those for the pair of lower chart frame flexure ribbons 38 are shown in Figures III, IV and V, while the upper chart frame flexure ribbon 36 is shown in Figures II and V without guards.

Referring to Figures VI and VII in particular, Figure VI being a view looking into the front of the chart 34 in contrast to Figure V which is a view looking into the back of the chart, the chart 34 is clipped over a large opening 41 in a rectangular plate 42 by clips 43, there being a glass cover 44 between the clips and the chart to protect it. The chart 34, the cover 44 and the plate 42 make up a chart assembly which is first adjustably attached during assembly of the scale to the chart frame 35 by a pair of eccentric screws 45 and positioned by means of the screws 45 to locate the chart 34 square with the motion of the scale and then fixedly attached to the chart frame 35 by four clamp screws 46.

Referring to Figure II in particular, the main lever 4 and the chart lever 37 form the opposite sides of a parallelogram 47 in all positions occupied by the levers during normal weighing operations. The main lever side of the parallelogram 47 is represented by the broken line 48 which is drawn from the center of the fulcrum axis stud 11 through the effective center of the upper chart frame flexure ribbon 36 and the chart lever side of the parallelogram is represented by the broken line 49 which is drawn from the effective center of the chart lever flexure ribbon 39 through the effective center of the lower chart frame flexure ribbon 38. The plane of the indicia-bearing chart 34 forms the right-hand side of the parallelogram 47 as viewed in Figure II and the left-hand side is represented by the broken line 50 which is drawn from the center of the fulcrum axis stud 11 through the effective center of the chart lever flexure ribbon 39. The indicia-bearing chart 34 moves in an arcuate path such that the chart has a component of motion normal to its face along with the ends of the pair of levers 4 and 37. The plane of the chart 34, because of the parallelogram geometry, in any position in its arcuate path is parallel to the plane of the chart in any one of its other positions in the path. This helps in maintaining the optical projection system in focus.

The extension of the load counterbalancing spring 7, which is proportional to the load upon the platter 1, permits the spring supported end of the main lever 4 to drop a distance proportional to the load and this movement is transmitted to the chart 34, directly attached to the lever, to move the chart through equal increments for equal increments of load on the scale, the spring 7 being rigidly attached to the lever 4 by means of the calibrator clamp 10. The upper end of the spring 7 is rigidly connected by the calibrator clamp 8 to a threaded rod 51 (Figures I and IV) attached at its upper end to a trunnion 52 having horizontally extending pins 53 which rest in V-shaped bearing surfaces 54 of a bifurcated portion 55 of a bell crank 56, the threaded rod 51 being rockable about the axes of the pins 53. The bell crank 56 is rockable about the axes of cone-pointed screws 57 which are threaded through the ears 58 of a bracket 59 fixedly mounted on a shelf 60 that is supported by four posts 61 erected from the base 6 of the scale, the posts 61 and the shelf 60 forming the frame 9 which is covered by a suitable housing 62 the top of which is illustrated in Figure XIII. The screws 57 cooperate with conical depressions in the bell crank 56 and are held against turning by lock nuts 63 which are so adjusted that the bell crank is free to rock yet is mounted with a minimum of play.

The bell crank 56 may be rocked either by turning a tare knob 64 which is located exteriorly of the housing 62 on the end of a sleeve-like screw 65 that is threaded through the bracket 59 to move an end of a second screw 66 threaded within the sleeve-like screw toward or away from the lower arm of the bell crank or the bell crank may be rocked by directly turning the second screw 66 and holding the sleeve-like screw 65 stationary. Force provided by the spring 7 always urges the bell crank 56 against the end of the second screw 66 and the pins 53 against the bearing surfaces 54 of the bifurcated portion 55 of the bell crank. When the sleeve-like screw 65 is turned by the tare knob 64, the second screw 66 always turns with it as one because the second screw is threaded through the inside of a coil which is not shown but which is threaded in turn into a threaded part of the sleeve-like screw. The screw 66 can be turned relative to the screw 65 by holding the knob 64 with one hand and by turning the screw 66 by means of a screw driver, the kerf 67 of the screw 66 being about flush with the outer surface of the tare knob 64 as shown in Figure IV.

In order that the tare weight of a container placed upon the platter 1 may be offset, the tare knob 64 is turned clockwise as viewed in Figures IV and XIII to advance the end of the screw 66 toward the bell crank 56 until zero weight is indicated on a display screen 68 (Figures I, IV and XIII) fixedly attached to a pair of posts 69 erected from the shelf 60 of the frame 9. (The optical system for projecting images of the indicia on the chart 34 onto the screen 68 will be described hereinafter.) This rocks the bell crank 56 about the axes of the cone-pointed screws 57 and lifts the spring supported end of the main lever 4 and the chart 34 operating in unison therewith upward a distance equal to the distance which the end of the lever moved downward under the influence of the tare weight of the container upon the platter. Zero adjustment is made by holding the tare knob 64 stationary and turning the screw 66 to rock the bell crank 56 and position the spring 7 and the spring supported end of the lever 4 along with the parts operating in unison therewith.

In operation, the zero adjustment is made first by holding the tare knob 64 stationary and turning the screw 66 until zero weight indication is displayed on the screen 68 when no load is upon the platter 1. A container to be filled is then placed upon the platter and the tare knob is turned until zero weight indication is displayed again on the screen 68. After the container is filled, the correct weight of the net load in the container is indicated on the screen 68.

The calibrator clamps 8 and 10 (Figures I, II and IV) each includes a block 70, a clamp 71 and a clamp screw 72, an end of the spring 7 being clamped between the block and the clamp which is held in place by the clamp screw. Each of the blocks 70 has a clamping surface 73 (Figure II) which is curved to fit a flat side of an end of the spring 7 and each of the clamps 71 has a clamping surface 74 which is relieved relative to a clamped part of an end of the spring 7 to provide two gripping points on the end of the spring. The relieved part of the clamp 71 is indicated at 75 in Figure II and insures that there is no possibility for the end of the spring to shift in the calibrator during operation of the scale by concentrating the force exerted by the clamp screw at the two gripping points instead of allowing the force provided by the screw to be greatly divided and distributed along the clamping surfaces 73 and 74 so that the clamping force of the calibrator on the spring is always much greater than the shear force on the spring at its take off point from the calibrator. The upper clamp 8 is attached to the lower end of the threaded rod 51 and the lower clamp 10 is attached to the end of the lever 4 by a screw 76 (Figure II). Rigidly mounting the ends of the weighing spring 7 so that there is no possibility for the spring to shift in its mountings during operation removes practically all of the erratic error of the scale and also the back weighing error, i.e., the difference between the indication of load when the load is increased as against the indication of the same load as the load is being decreased.

Since it is usually impossible to wind springs to have a certain load carrying capacity at a certain extension, the calibrators 8 and 10 also function to vary selectively the location of the gripping points on the spring 7. This is accomplished by loosening the clamp screws 72, by loosening the connections between the blocks 70 and the lever 4 and the rod 51, and by turning the blocks about vertical axes. Thus, if the spring 7 is too stiff, one or the other or both of the calibrators can be turned relative to the spring to lengthen its effective or usable length and thereby increase its deflection for a given unit of load placed upon the load receiver 1. Conversely, if the spring is too weak such that the spring extension is too great for the correct indication of load, one or the other or both of the calibrators can be turned relative to the spring to shorten its effective or usable length and thus reduce its extension for a given load applied to the load receiver 1.

The scale is provided with an improved optical system which is simple to operate and which produces brilliant, easy-to-read projected images of the weight, unit price and computed value indicia on the display screen 68. The system includes an optical frame 77 which is pivotally mounted like a cradle by means of flexure ribbons 78 from three feet 79 rigidly connected to the base 6 of the scale. One of the feet 79 is located near the center of the base 6 and the other two feet or located at the back of the base. Each of the flexure ribbons 78 has two bending areas provided by guards 80 each of which includes a lower pair of clamps 81 attached to a foot 79 by a screw 82, an upper pair of clamps 83 attached to the optical frame 77 by a screw 84 and a center pair of clamps 85 attached to a flexure ribbon 78 by screws 86, the flexure ribbons 78 being sandwiched between the clamps in each pair of clamps. The ends of the center clamps 85 are spaced slightly from adjacent ends of the end clamps 81 and 83 to permit each of the flexure ribbons 78 to have two bending areas. Such clamp ends are formed with a relieved area adjacent the flexure ribbons to space the clamp ends far enough from the flexure ribbons to permit the flexure ribbons to bend without touching the clamps within limits and, thus, prevent the flexure ribbons from buckling under unusual forces. The flexure ribbons 78 are shown in their relative position to the rest of the scale in Figures I and II, in perspective in Figures III and V and in detail in Figures VIII–X.

An adjustably mounted slide rail 87 is carried by the pivotally mounted optical frame 77 closely adjacent to and parallel with the chart 34. The left-hand end of the slide rail 87 as viewed in Figure IX is pivotally attached to an ear 88 of the optical frame which has a V-notched bearing surface 89 that cooperates with a cylindrical surface 90 of the slide rail, the surfaces 89 and 90 being shown slightly spaced apart in Figure IX for clarity of illustration. A screw 91 holds the surfaces 89 and 90 together. The right-hand end of the slide rail 87 is adjustably attached to an ear 92 of the optical frame 77 by a stud 93 that is threaded into the ear 92 and that extends through an oversize opening in the slide rail in a sloppy fit. Lock nuts 94 threaded on the stud 93 against each side of the slide rail 87 are provided to hold the slide rail in a position on the stud which is adjustable along the axis of the stud and an adjustment screw 95 threaded through the slide rail against the stud 93 is provided to force the stud toward a member 96 that is located in a vertical cylindrical hole in the bottom of the slide rail and that is urged toward the stud by means of a coil spring 97 which is held in place by a screw 98. When the screw 91 at the left-hand end of the slide rail 87 and the lock nuts 94 at the right-hand end of the slide rail are loosened, the slide rail can be pivoted about the horizontal axis of the screw 91 by turning the adjustment screw 95 or the slide rail can be pivoted about a vertical axis between the V-notched bearing surface 89 of the ear 88 of the optical frame and the cylindrical surface 90 of the slide rail. The screw 91 and the lock nuts 94 are retightened to hold the slide rail in adjusted position. The purpose of such adjustments is explained hereinafter together with several other adjustments provided for the optical projection system.

The optical system is divided into a weight projection subassembly 99 stationarily mounted on the right-hand end of the optical frame 77 as viewed in Figure V and a unit price and computed value projection subassembly 100 shiftably mounted on the left-hand end of the slide rail 87. The weight projection subassembly 99 includes a generally U-shaped bracket 101 fixedly attached by screws 102 to the optical frame 77 adjacent the ear 92 on the frame, the legs of the U straddling an end of the chart 34 as shown in Figure IX, on which bracket 101 a projection lens 103 is adjustably mounted at one side of the chart 34 and a first mirror 104, a condensing lens 105 and a second mirror 106 are adjustably mounted at the other side of the chart.

The unit price and computed value projection subassembly 100 includes a generally U-shaped carriage 107 having a hooked portion 108 which is slidable on the slide rail 87, the legs of the U straddling an end of the chart 34 as shown in Figure IX. The hooked portion 108 of the carriage is provided with a suitable number of slide buttons 109 three of which are shown in Figure X. Gravity tends to rotate the carriage 107 counterclockwise, as viewed in Figure X, about the slide rail 87 so that the buttons are continuously forced against the slide rail to keep play out of the system, while that part of the hooked portion 108 of the carriage to the right of the slide rail as viewed in Figure X prevents the carriage from coming off of the slide rail. Limit stop washers 110 on the carriage which are spaced at 111 from the bottom of the slide rail 87 prevent the carriage from being lifted from the slide rail within limits. A projection lens 112 is adjustably mounted on the carriage 107 at one side of the chart 34 and a condensing lens 113 and a mirror 114 are adjustably mounted on the carriage at the other side of the chart. A stationary mirror 115 is adjustably mounted on the optical frame 77 adjacent the ear 88 on the frame.

The carriage 107 is selectively shiftable on the slide rail 87 in a path parallel to the chart 34 as indicated by the double-ended arrow in Figure IX by means of a cord drive part of which is illustrated in perspective in Figure IV. The cord drive comprises an upper cord 116 which runs over a pair of idlers 117, one of which is shown in Figure IV, mounted on brackets 118a adjustably attached to the shelf 60 of the frame 9, around a spool 118 fixed on a shaft 119 rotatably supported at its ends in a bracket 120 mounted on a pair of posts 121 erected from the shelf 60 and over a third idler which is not shown but which is like the idlers 117 and which is mounted on a bracket 122 carried by the shelf 60 at the same elevation as the spool 118. The upper cord 116 is attached by springs 124, one of which is shown in Figure IV, one at each of its ends to the ends of a lower cord 125 which is of the same length as the upper cord. The springs 124 function to keep the cords under tension and, thus, prevent play in the cord drive. The lower cord 125 runs over a pair of pulleys 126 (Figures I, VIII, IX and X) mounted one on each end of the slide rail 87 and is fixedly clamped to the carriage 107 by means of a screw 127 and a washer 128 which can be seen in Figure VIII through an opening 129 in the slide rail. The carriage 107 may be shifted back or forth on the slide rail 87 by turning a price selector knob 130 fixedly attached to the end of the shaft 119 exteriorly of the housing 62 which turns the spool 118 and drives the cords 116 and 125 in the selected direction.

A main and a reserve light source (Figures I, IV, V and XI) is provided for the weight projection subassembly 99 and for the unit price and computed value subassembly 100; it consists of a lamp or bulb 131 of the double filament type which is mounted in a socket plate 132 that is fixedly attached to a socket block 133 pivoted on the axes of a pair of opposed cone-pointed screws 134 which are threaded through a bracket 135 fixedly attached to the back of a plate 236 hung from the back of the shelf 60 of the frame 9. The bulb 131 protrudes from the socket plate 132 through an opening in the plate 136 and a stud 137 fixedly attached to the socket block 133 extends through a second opening in the plate 136 as shown in Figure IV. In addition to the two points of support for the socket block 133 provided by the cone-pointed screws 134, a third supporting point is provided by a toggle spring 138 (Figure V) which is clipped between a clip 139 on the socket block and a toggle anchor 140 fixed to the back of the plate 136. The socket block 133 may be pivoted from a first position determined by an adjustment screw 141 to a second position determined by an adjustment screw 142, which screws are threaded through the plate 136 as shown in Figures I and IV, by means of finger pressure on the stud 137. Very little finger pressure need be used because the spring 138 forms an over-center toggle which when it gets past its center snaps the socket block 133 against one or the other of the adjustment screws 141 and 142. The terminal end of the bulb 131 engages lamp contacts 143 (Figure XI). One or the other of the lamp contacts 143, depending on the position of the socket block, is connected to the contacts 144 of a filament switch 145 that is fixedly connected to the bracket 135 closely adjacent the back of the socket block 133 for the purpose of energizing only one of the filaments in the bulb 131 at a time, the filament switch 145 and the socket plate 132 being connected by leads 146 and 147, respectively, to the secondary winding of a suitably mounted transformer 148.

Two condensing lenses 149 and 150 (Figures I and IV) are adjustably mounted on the plate 136. The pivotal mounting of the socket block 133 provides for bringing either one or the other of the filaments of the lamp 131 into accurate alignment or focus with the optical axes of the lenses 149 and 150. As purchased, the distance between the filaments varies from lamp to lamp and, therefore, the filaments are prefocused during assembly of the scale in the factory or by a serviceman in the field by proper adjustment of the screws 141 and 142. The brilliancy and the clearness of the images of the indicia on the chart 34 which are projected onto the display screen 68 determines the positioning of the adjustment screws 141 and 142. When one of the prefocused filaments in the lamp 131 fails, the scale operator merely manipulates the stud 137 to pivot the socket block 133 into its second prefocused position to bring the reserve filament automatically into accurate focus with the optical axes of the condensing lenses 149 and 150. Thus, failure of the light source during use of the scale does not significantly disrupt such use. In one prefocused position of the socket block 133, current flows through the closed one of the switch contacts 144 to energize one of the filaments in the bulb 131. Pivoting of the socket block 133 about the axes of the cone-pointed screws 134 into its second prefocused position breaks the circuit through such closed switch contact 144 and closes the circuit through the other one of the switch contacts 144 to energize the other one of the filaments in the bulb. The adjustment screws 141 and 142 are locked in adjusted position by nuts 151 and the cone-pointed screws 134 are locked in adjusted position by nuts 152.

A light beam projecting images of weight indicia, which is represented by the long dash line 153 in Figure I, emanates from the lamp 131 and passes first through the condensing lens 149 to the mirror 104 which turns it horizontally and parallel to the chart 34 (see Figures VIII and IX). The beam 153 then passes through the condensing lens 105 to the mirror 106 which turns it through 90° (Figure IX) and causes the beam to travel in the proper direction to pass through a weight column (Figure XII) of the chart 34 and through the projection lens 103 to a mirror 154 adjustably attached to the bracket 101 which turns it as indicated in Figure I so that it travels upwardly to a mirror 155 attached to a pair of posts 156 erected from the shelf 60 of the frame 9. The beam 153 is reflected by the mirror 155 to the display screen 68 having a frosted front surface 157 with an index line 158 thereon.

A second light beam projecting images of unit price and/or computed value indicia, which second beam also is represented by the dash line 153 in Figure I, since in Figure 1 one beam is directly behind the other beam, but which second beam is represented by the dash line 153a in Figures VIII and IX, emanates from the lamp 131 and passes first through the condensing lens 150 to the mirror 115 (Figures V, VIII and IX) which turns it horizontally and parallel to the chart 34 (see Figures VIII and IX). The beam 153a then passes through the condensing lens 113 to the mirror 114 which turns it through 90° (Figure IX) and causes the beam to travel in the proper direction to pass through unit price and/or value columns (Figure XII) of the chart 34 and through the projection lens 112 to a mirror 159 adjustably attached to the carriage 107. The mirror 159, as viewed in Figure I, is directly behind and hidden by the mirror 154. The mirror 159 turns the beam upwardly so that it travels to a mirror 155a (Figure IV) which is in the same plane as the mirror 155 and which reflects the beam onto the display screen 68.

Provision is made by means of suitable baffles or shields for preventing possible interference of the several light beams carrying the different images in the optical system and for shielding the optical system from stray reflected light rays. Referring to Figures IV, V and XIII, a vertical baffle 160 carried by the shelf 60 of the frame 9 is located between the "Weight" indication part of the screen 68 and the "Value" indication part of the screen, thus, separating the mirror 155 from the mirror 155a. Referring to Figures III and IV, a shield 161 attached to the plate 136 surrounds the bottom and one side of the lamp 131.

The weight, unit price and computed value columns of the chart 34 are shown schematically in Figure XII and are shown as they actually appear in their projected form in "Weight" and "Value" windows which are located in front of the display screen 68 in Figure XIII. The chart 34 as shown in Figure XII is oriented in the way that it appears looking into the back of the scale (see Figure V), except that it is shown inverted in Figure XII for clarity of illustration. In its inverted position in Figure XII, the indicia are upright and are movable in response to movement of the weighing mechanism in directions indicated by the vertical arrows.

In operation when no load is upon the load receiver 1, the zero line 162 on the chart 34 is located opposite to and in alignment with the optical axes of the projection lenses 103 and 112. The zero indicium in the weight column 163 is projected as an inverted image by the weight projection subassembly 99 onto the display screen 68 at the index line 158 in the "Weight" window as shown in Figure XIII. Above the index line 158 in the window is displayed images of part of the tare portion 164 of the weight column and below the index line 158 is displayed images of part of other indicia in the weight column 163. The zero indicium in one of the value columns 165 is projected as an inverted image by the unit price and computed value projection subassembly 100 onto the display screen 68 at the index line 158 in the "Value" window. Above the index line 158 in the window is displayed images of one or perhaps two like unit price indicia in the price range 166 and below the index line 158 is displayed images of part of the indicia in one of the value columns 165, there being a wide range of unit prices on the chart 34 and a vertical column of computed value indicia above each unit price which values are computed for various weights of commodities at a particular price. The image of the particular unit price displayed along with the image of its computed value column depends on the position of the selectively shiftable carriage 107 which carries the projection lens 112 along the slide rail 87. As shown in Figure XIII, the unit price "100" appears in the "Value" window representing a price of one dollar per pound of a commodity to be weighed. The operator of the scale, from a position in front of the scale, selects the desired unit price of the commodity to be weighed by turning the price selector knob 130 which reciprocates the carriage 107 along the slide rail 87 to direct the beam projecting images of unit price and/or computed value indicia through a selected column of indicia until the image of the selected unit price indicia appears in the "Value" window. As previously indicated, images of one or perhaps two like price indicia in the price range 166 are displayed. This is caused by there being several identical unit price indicia in each one of the price columns as illustrated in the upper right-hand portion of Figure XII.

After the correct unit price is selected by the operator so that its image is displayed on the screen 68 in the "Value" window, a container for the commodity to be weighed is placed upon the platter 1. This causes the spring-supported end of the main lever 4 to move downward carrying with it the chart 34. Downward movement of the chart 34 moves the zero line 162 on the chart away from the optical axes of the projection lenses 103 and 112 and indicia in the weight column 163 are displayed in the "Weight" window and computed value indicia in the selected one of the value columns 165 are displayed in the "Value" window, the weight of the container being indicated by the index line 158. The operator then turns the tare knob 64 to lift the spring-supported end of the main lever 4 until zero weight indication is again displayed.

The commodity to be weighed then is placed in the tared off container and the chart 34 again mives downward until the net weight of the commodity is indicated in the "Weight" window and the value of such commodity computed according to the selected unit price is indicated in the "Value" window. Such downward movement of the chart 34 moves the price range 166 on the chart completely out of the field of view of the projection lens 112 so that unit prices are no longer displayed on the screen 68. If the operator knows the tare weight of the container before he begins the weighing cycle, he may turn the tare knob 64 until such tare weight is indicated in the "Weight" window and then place the filled container on the load receiver 1. The correct net weight of the commodity is then indicated in the "Weight" window. When the filled container is removed from the load receiver 1, the tare weight of the container again is indicated by the projected image of the tare portion 164 of the weight column 163 in the "Weight" window.

Adjacent the tare selector knob 64 and the price selector knob 130 which are both located exteriorly of the housing 62 is located a switch knob 167 for turning the lamp 131 on and off. As hereinbefore described, the vertical baffle 160 is located between the "Weight" indication part of the screen 68 and the "Value" indication part to prevent possible interference between the several light beams carrying the different images in the optical system. Such interference is prevented at the origin of the images by separating the value columns 165 from the weight column 163 by a blank space 168 on the chart 34 (Figure XII).

As hereinbefore described, the main lever 4 and the chart lever 37 form the opposite sides of a parallelogram in all positions occupied by the levers during normal weighing operations. The chart 34 forms a third side of such parallelogram and moves in an arcuate path such that the chart has a component of motion normal to its face along with the ends of the levers, the plane of the chart in any position of the chart in its path being parallel to the plane of the chart in any one of its other positions in the path. To compensate for the component of motion of the chart, means movable with the lever 4 are provided for automatically focusing the optical projection system. Such movable means includes the optical frame 77 which is pivotally mounted as hereinbefore described from the three feet 79 that are rigidly connected to the base 6 of the scale. The pivotally mounted optical frame 77 is connected by a flexure ribbon 169 (Figures II and III) protected by guards 170 which are shown in Figure III but not in Figure II, which are like the guards 40 hereinbefore described, to a drive link 171 that is pivotally connected in turn by means of ball bearings 172 (Figure II) to a bifurcated member 173 on the chart lever 37. The flexure ribbon 169 is connected to the optical frame 77 by a screw 174 and to the drive link by a screw 175. As the chart 34 moves back and forth with the chart lever 37 to which it is attached, the chart lever 37 moves the optical frame 77 a corresponding distance back and forth to maintain the physical distance between the projection lenses 103 and 112, carried by the optical frame 77, and the chart 34 approximately constant to keep the optical system in focus. For the best focus, i.e., so as to keep the images of the chart on the screen sharp, the projection lenses are moved a distance which is slightly more than the component of motion of the chart that it is intended to correct. It would be possible to eliminate such means for automatically focusing the optical projection system by using a chart consisting of a section of a cylinder having a curvature approximating the arcuate path through which the end of the lever 4 moves. This would keep the physical distance between stationary projection lenses and the chart constant for all positions occupied by the lever during normal weighing operations. However, although such a chart can be made, it is of too high a cost to be practicable for use in scales made in high production runs.

The optical system is provided with several adjustments for focusing and aligning the various elements therein. As hereinbefore described, the slide rail 87 is pivotal about a vertical axis between the V-notched bearing surface 89 (Figure IX) of the ear 88 of the optical frame 77 and the cylindrical surface 90 of the slide rail 87 to position the slide rail relative to the chart 34 so that the projection lens 112 is moved by the carriage 107 in a path which is parallel to the chart to maintain a uniform distance between the chart and the projection lens for focus. The slide rail 87 is also pivotal about the horizontal axis of the screw 91 (Figure IX) to align the projected images of the zeros in the value columns 165 so that as the carriage 107 is moved along the slide rail 87 all of the zeros are at the index line 158 in the "Value" window with no load upon the load receiver 1.

The condensing lenses 149 and 150 are mounted in brackets 176 (Figure I) having slotted feet attached to the plate 136 by screws through slots in the feet so that the lenses are adjustable for focus. The condensing lenses 105 and 113 are adjustably mounted for focus by similarly attached brackets 178 (Figures V, VIII and IX), the bracket for the condensing lens 105 being attached to a leg of the U-shaped bracket 101 and the bracket for the condensing lens 113 being attached to a leg of the U-shaped carriage 107.

The mirror 115 is pivotally mounted on a generally vertical post 179 threaded into the optical frame 77, the post 179 being adjustable up and down and about its axis. The mirror 115 can be pivoted about a generally horizontal axis when a set screw 180 threaded into the top of the post 179 is loosened and the post 179 can be adjusted up and down by turning when a lock nut 181 is loosened. The three adjustments for the mirror 115, i.e., pivoting the mirror on its post, pivoting the post on the optical frame, and the up and down adjustment for the post, permits positioning of the beam 153a from the mirror 115 onto the center of the condensing lens 113. Similarly and for similar reasons, the mirror 104 is pivotally mounted on a generally vertical post 182 threaded into the U-shaped bracket 101. The mirror 104 can be pivoted about a generally horizontal axis when a set screw 183 threaded into the top of the post 182 is loosened and the post 182 can be adjusted up and down by turning when a lock nut 184 is loosened. The three adjustments for the mirror 104, i.e., pivoting the mirror on its post, pivoting the post on the bracket 101, and the up and down adjustment for the post, permits positioning of the beam 153 from the mirror 104 onto the center of the condensing lens 105.

The mirror 106 is held in a holder 185 having a tenon in a hole in the U-shaped bracket 101 which tenon is engaged by a set screw 186 (Figures V, VIII and IX). The generally vertical axis of the hole in the bracket is directly in line with the optical axis of the projection lens 103 also mounted on the bracket so that by loosening the set screw 186 and pivoting the holder 185 the beam 153 from the condensing lens 105 may be directed through the chart 34 along the optical axis of the projection lens 103. Similarly, the mirror 114 is held in a holder 187 having a tenon in a hole in the U-shaped carriage 107 which tenon is engaged by a set screw 188. The generally vertical axis of the hole in the carriage is directly in line with the optical axis of the projection lens 112 also mounted on the carriage so that by loosening the set screw 188 and pivoting the holder 187 the beam 153a from the condensing lens 113 may be directed through the chart 34 along the optical axis of the projection lens 112.

The projection lens 103 is held in a V-shaped notch 189 (Figure III) in the U-shaped bracket 101 and the projection lens 112 is held in a similar notch 190 in the U-shaped carriage 107. Plates 191 hold the lenses 103 and 112 down in the notches 189 and 190, respectively. Each of the lenses 103 and 112 is provided with a groove 192 (Figure IX) which encircles the usual barrel-like holder for the lens. An eccentric screw 193 has a tenon fitted within the groove and functions as a means for shifting the lens in its V-shaped notch toward or away from the chart 34 for focusing.

The mirror 154 (Figures I and IX) is held in a C-shaped bracket 194 having a tenon 195 within a hole in the U-shaped bracket 101. A set screw 196 retains the tenon 195 in the hole. When the set screw 196 is loosened, the mirror 154 can be pivoted about the axis of the tenon 195 to locate the projected images of the weight indicia square with the "Weight" window in front of the display screen 68. The distance between the legs of the C-shaped bracket 194 can be varied by turning a screw 197 which extends through the upper leg (Figure I) and which is threaded into the lower leg to pivot the mirror 154 about a generally horizontal axis to tip the mirror vertically for zero adjustment of the projected images of the weight indicia in the "Weight" window.

Similarly, the mirror 159 (Figures IX and X) is held in a C-shaped bracket 198 having a tenon 199 within a hole in the carriage 107. A set screw 200 retains the tenon 199 in the hole. When the set screw 200 is loosened, the mirror 159 can be pivoted about the axis of the tenon 199 to locate the projected images of the unit price and/or computed value indicia square with the "Value" window in front of the display screen 63. The distance between the legs of the C-shaped bracket 198 can be varied by turning a screw 201 which extends through the upper leg (Figure X) and which is threaded into the lower leg to pivot the mirror 159 about a generally horizontal axis to tip the mirror vertically for zero adjustment of the projected images of the computed value indicia in the "Value" window.

The scale may be modified by fixedly mounting the optical frame 77 on the base 6 of the scale instead of pivotally mounting it and by substituting the chart assembly which is shown in Figures XIV–XVI for the chart assembly that is shown in Figures VI and VII. Reference numerals in Figures XIV–XVI which are similar to reference numerals in Figures I–XIII identify elements which are alike in structure and in function to those illustrated in Figures I–XIII. The substitution of the chart assembly which is shown in Figures XIV–XVI for the chart assembly that is shown in Figures VI and VII is necessary because the stationary optical frame in the modified scale does not maintain the physical distance between the chart and the projection lenses approximately constant and means other than the pivotally mounted optical frame must be provided for automatically focusing the optical system to compensate for the arcuate path of the chart.

The means for automatically focusing the optical system to compensate for the arcuate path of the chart includes a positive lens 202 (Figures XIV–XVI) and a negative lens 203 in juxtaposition and movable as one with a chart 34a, the positive lens 202 facing the projection lenses, i.e., the projection lenses are located on the left-hand side of the positive lens as viewed in Figure XVI.

The positive lens 202 functions to maintain the optical distance between the chart 34a and the projection lenses constant automatically focusing the optical system when the chart 34a is moved past the projection lenses in its arcuate path, while the negative lens 203 functions to correct or to neutralize the bending of the light beams projecting images of weight, unit price and computed value indicia as they might otherwise leave the positive lens. The positive lens 202 and the chart 34a are so located relative to the projection lenses at one half scale capacity that the optical axes of the lenses are opposite to and in alignment with the the centers of the positive lens and of the chart. At such one half scale capacity, the light beams pass through the chart and the positive lens 202 along a line that is indicated by the arrow in Figure XVI and pass through the projection lenses along their optical axes. However, without the negative lens 203, the positive lens 202 would bend the light beam passing through it whenever the chart 34a is moved by the weighing mechanism out of its one half capacity position so that the beams would impinge at sharp angles upon the edges of the projection lenses instead of passing through the lenses along their optical axes. Such bending of the beams is particularly bad at the zero and full capacity positions of the chart and deleteriously effect the brilliancy and sharpness of the projected images.

To neutralize the bending of the light beams as they would otherwise leave the positive lens, the negative lens 203 puts oppositely directed bends in the light beams in the nature of compensating errors before they reach the positive lens so that the neutralizing bends imparted by the negative lens are cancelled by the bends imparted by the positive lens. The combination of the negative and positive lenses maintains light beams which are directed along the optical axes of the projection lenses during all positions of the chart 34a and are means movable with the levers for automatically focusing the optical system to compensate for the arcuate path of the chart.

The chart 34a is held by a pair of clamps 204 on a chart plate 42a, there being a glass cover 44a between the plate and the chart to protect the chart. The back of the chart 34a is covered by the negative lens 203 which is clipped to the chart by clamps 205 that are attached to the plate 42a by screws 206, the chart 34a and the negative lens 203 being located over a large rectangular opening 207 in the plate. The positive lens 202 is clipped onto the chart plate 42a over the opening 207 by clamps 208. The chart 34a, cover 44a, chart plate 42a, negative lens 203 and positive lens 202 make up a modified chart assembly which may be substituted for the chart assembly that is illustrated in Figures VI and VII by removing the pair of eccentric screws 45 and the four clamp screws 46 from the frame 35 (Figures VI and VII) and by replacing the latter assembly with the modified assembly. The modified assembly is first adjustably attached during assembly of the scale to the chart frame by the eccentric screws 45 and positioned by means of the screws 45 to locate the chart 34a square with the motion of the scale and then fixedly attached to the chart frame by the clamp screws 46.

The lever and spider ball bearings are locked during shipment of the scale by locking screws shown in Figure III. The lever ball bearings 5 are locked by a pair of screws 208, only one of which is shown in Figure III, which are threaded horizontally through the pedestals 16. One of the screws 208 is turned by hand against a side of the main lever 4, adjacent a bearing 5, and functions as a stop member, and the other one of the screws 208 is turned by means of a tool against the opposite side of the lever, adjacent the other bearing housing, to lock the bearings during shipment. The thrust provided by the hand operated screw or stop member, which is tightened first in the locking process, is not large enough to damage the bearings, and the thrust provided by the tool operated screw is taken by the hand operated screw instead of by the bearings. A second pair of screws 209, only one of which is shown in Figure III, is threaded through the spider 2 and functions to lock the spider bearings 3 in a similar manner. In unlocking the scale, the tool operated screws are released first and then the finger operated screws are released.

It will, of course, be understood that various details of construction may be varied over a wide range without departing from the principles of this invention, and it is therefore not the purpose to limit the patent granted hereon otherwise than necessitated by the scope of the appended claims.

Having described the invention, I claim:

1. A projected indication weighing scale comprising, in combination, a frame, a lever pivotally mounted within the frame, weighing mechanism that is fixed to the lever and to the frame and that is movable proportionally to load upon the scale with the lever and relative to the frame, a flat indicia-bearing chart carried by the lever in an arcuate path such that the chart has a component of motion normal to its face and such that it is moved through equal increments for equal increments of load upon the scale, a display screen fixed to the frame, an optical system for projecting images of the indicia on the chart onto the screen, and means movable with the lever for automatically focusing the optical system to compensate for the component of motion.

2. In a projected indication weighing scale including weighing mechanism, in combination, a pivotally mounted lever movable with the weighing mechanism in response to changes in load, a flat indicia-bearing chart carried by the lever in an arcuate path such that the chart has a component of motion normal to its face and such that its position is indicative of the weight of a load upon the scale, a stationarily mounted display screen, an optical system for projecting images of the indicia on the chart onto the screen, and means movable with the lever for automatically focusing the optical system to compensate for the component of motion.

3. A weighing scale comprising, in combination, a frame, a pair of levers which is pivotally mounted within the frame and which forms the opposite sides of a parallelogram, weighing mechanism that is operatively connected to the levers and to the frame and that is movable proportionally to load upon the scale with the levers and relative to the frame, a flat indicia-bearing chart which is carried by the levers in an arcuate path such that it is moved through equal increments for equal increments of load upon the scale and which forms another one of the sides of the parallelogram whereby the plane of the chart in any position in its arcuate path is parallel to the plane of the chart in any one of its other positions, a display screen fixed to the frame, an optical system for projecting images of the indicia on the chart onto the screen, and means movable with the levers for automatically focusing the optical system to compensate for the arcuate path of the chart.

4. In a weighing scale including weighing mechanism, in combination, a pair of pivotally mounted levers operatively connected to the weighing mechanism and movable in response to changes in load upon the scale and which forms the opposite sides of a parallelogram, a flat indicia-bearing chart which is carried by the levers in an arcuate path in accordance with the weight of a load upon the scale and which forms another one of the sides of the parallelogram whereby the plane of the chart in any position in its arcuate path is parallel to the plane of the chart in any one of its other positions, a stationarily mounted display screen, an optical system for projecting images of the indicia on the chart onto the screen, and means movable with the levers for focusing the optical system to compensate for the arcuate path of the chart.

5. A projected indication weighing scale comprising, in combination, a frame, a second class lever pivotally mounted within the frame, a load counterbalancing spring connected between the frame and the lever, a flat indicia-bearing chart carried by the lever in an arcuate path and positioned by the lever according to the load upon the scale, a display screen fixed to the frame, an optical system for projecting images of the indicia on the chart onto the screen, and means movable with the lever for automatically focusing the optical system to compensate for the arcuate path of the chart which arcuate path otherwise by varying the distance between the chart and a part of the optical system destroys the focus of the optical system.

6. In a projected indication weighing scale having weighing mechanism, in combination, a flat indicia-bearing chart movable in an arcuate path with the weighing mechanism and in accordance with load upon the scale, a stationarily mounted display screen, an optical system for projecting images of the indicia on the chart onto the screen, and means movable with the weighing mechanism for automatically focusing the optical system to compensate for the arcuate path of the chart.

7. A projected indication weighing scale comprising, in combination, a frame, a pair of levers including a main lever and a chart lever which is pivotally mounted within the frame and which forms the opposite sides of a parallelogram, a load counterbalancing spring connected between the frame and the main lever, a flat indicia-bearing chart which is carried by the levers in an arcuate path proportionally to load upon the scale and which forms another one of the sides of the parallelogram whereby the plane of the chart in any position in its arcuate path is parallel to the plane of the chart in any one of its other positions, a display screen fixed to the frame, an optical system for projecting images of the indicia on the chart onto the screen, and means movable with the levers for automatically focusing the optical system to compensate for the arcuate path of the chart.

8. In a projected indication weighing scale, in combination, a pair of levers including a main lever and a chart lever which forms the opposite sides of a parallelogram, a flat indicia-bearing chart which is carried by the levers in an arcuate path in accordance with the weight of a load upon the scale and which forms another one of the sides of the parallelogram whereby the plane of the chart in any position in its arcuate path is parallel to the plane of the chart in any one of its other positions, a stationarily mounted display screen, an optical system for projecting images of the indicia on the chart onto the screen, and means movable with the levers for focusing the optical system to compensate for the arcuate path of the chart.

9. In a weighing scale including weighing mechanism, the combination of a lever movable in response to movement of the weighing mechanism, a display screen, a flat chart that is carried by the lever in an arcuate path in accordance with the weight of a load upon the scale and that has indicia arranged thereon in parallel columns, means comprising a light source and a projection lens for projecting a light beam through the chart to form images of the chart indicia on the screen, means for shifting the projection lens in a path which is parallel to the chart to direct the beam through a selected column of indicia, and means movable with the lever for automatically focusing the projection lens to compensate for the arcuate path of the chart.

10. In a weighing scale including weighing mechanism, the combination of a lever movable in response to movement of the weighing mechanism, a display screen, a chart that is carried by the lever in an arcuate path and that has indicia arranged thereon in parallel columns, means comprising a light source and a projection lens for projecting a light beam through the chart to form images of the chart indicia on the screen, means for shifting the projection lens in a path which is parallel to the chart to direct the beam through a selected column of indicia, and a pivotally mounted optical frame that carries the projection lens and that is movable in response to movement of the lever for automatically maintaining an approximately constant distance between the chart and the projection lens to keep the lens in focus.

11. In a weighing scale including weighing mechanism, the combination of a pair of levers which is movable in response to movement of the weighing mechanism and which forms the opposite sides of a parallelogram, a display screen, a flat chart that is carried by the levers and movable through equal increments for equal increments of load upon the scale, and that forms another one of the sides of the parallelogram whereby the plane of the chart in any position in its path is parallel to the plane of the chart in any one of its other positions and that contains indicia arranged thereon in parallel columns, means comprising a light source and a projection lens for projecting a light beam through the chart to form images of the chart indicia on the screen, means for shifting the projection lens in a path which is parallel to the chart to direct the beam through a selected column of indicia, and means movable with the levers for automatically focusing the projection lens.

12. In a weighing scale including weighing mechanism, the combination of a pair of levers which is movable in response to movement of the weighing mechanism and which forms the opposite sides of a parallelogram, a display screen, a chart that is carried by the levers and that forms another one of the sides of the parallelogram whereby the plane of the chart in any position in its path is parallel to the plane of the chart in any one of its other positions and that contains indicia arranged thereon in parallel columns, means comprising a light source and a projection lens for projecting a light beam through the chart to form images of the chart indicia on the screen, means for shifting the projection lens in a path which is parallel to the chart to direct the beam through a selected column of indicia, and a pivotally mounted optical frame that carries the projections lens and that is movable in response to movement of the levers for automatically maintaining an approximately constant distance between the chart and the projection lens to keep the lens in focus.

13. A weighing scale comprising, in combination, a frame, a lever pivotally mounted within the frame, a load counterbalancing spring connected between the frame and the lever, a flat indicia-bearing chart carried by the lever in an arcuate path and movable in accordance with the weight of load upon the scale, a display screen fixed to the frame, means comprising a light source and a projection lens for projecting a light beam through the chart to form images of the chart indicia on the screen, and means movable with the lever for automatically focusing the projection lens to compensate for the arcuate path of the chart.

14. A weighing scale according to claim 13 wherein the means for automatically focusing the projection lens includes a pivotally mounted optical frame that carries the projection lens and that is movable in response to movement of the lever for automatically maintaining an approximately constant distance between the chart and the projection lens.

15. In a weighing scale including weighing mechanism, an indicia-bearing chart that is movable in response to movement of the weighing mechanism and a display screen, an optical projection system which comprises, in combination, a light source, an optical frame that is pivotally mounted and that is operatively connected to the weighing mechanism, a carriage that is carried by the optical frame and that is selectively shiftable relative thereto in a direction parallel to the chart, and a projection lens that is adjustably mounted on the carriage and that projects images of selected ones of the indicia on the chart onto the screen, the optical frame being movable in response to movement of the weighing mechanism in a direction to shift the carriage and the projection lens carried thereby toward or away from the chart to maintain an approximately constant distance between the chart and the lens.

16. In a weighing scale including weighing mechanism and a display screen, in combination, an indicia-bearing chart that is movable in an arcuate path in response to movement of the weighing mechanism, the plane of the chart in any position in its arcuate path being parallel to the plane of the chart in any one of its other positions in the path, and an optical projection system which comprises a light source, an optical frame that is pivotally mounted and that is operatively connected to the weighing mechanism, a carriage that is carried by the optical frame and that is selectively shiftable relative thereto in a direction parallel to the chart, and a projection lens that is adjustably mounted on the carriage and that projects images of selected ones of the indicia on the chart onto the screen, the optical frame being movable in response to movement of the weighing mechanism in a direction to shift the carriage and the projection lens carried thereby toward or away from the chart to maintain an approximately constant distance between the chart and the lens.

References Cited in the file of this patent

UNITED STATES PATENTS

| | | |
|---|---|---|
| 1,856,411 | Carroll | May 3, 1932 |
| 1,882,774 | Carroll | Oct. 18, 1932 |
| 2,634,966 | Williams | Apr. 14, 1953 |
| 2,723,113 | Meeker et al. | Nov. 8, 1955 |